(12) United States Patent
Singh et al.

(10) Patent No.: US 10,019,181 B2
(45) Date of Patent: Jul. 10, 2018

(54) METHOD OF MANAGING INPUT/OUTPUT(I/O) QUEUES BY NON-VOLATILE MEMORY EXPRESS(NVME) CONTROLLER

(71) Applicant: Samsung Electronics Co., Ltd., Suwon-si, Gyeonggi-do (KR)

(72) Inventors: Vikram Singh, Bengaluru (IN); Suman Prakash Balakrishnan, Karnataka (IN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 188 days.

(21) Appl. No.: 15/202,810

(22) Filed: Jul. 6, 2016

(65) Prior Publication Data

US 2017/0083252 A1 Mar. 23, 2017

(30) Foreign Application Priority Data

Jul. 10, 2015 (IN) .......................... 3544/CHE/2015
Sep. 22, 2015 (IN) .......................... 3544/CHE/2015

(51) Int. Cl.
*G06F 3/06* (2006.01)
*G06F 9/50* (2006.01)

(52) U.S. Cl.
CPC .......... *G06F 3/0619* (2013.01); *G06F 3/0604* (2013.01); *G06F 3/0656* (2013.01); *G06F 3/0659* (2013.01); *G06F 3/0679* (2013.01); *G06F 9/5016* (2013.01)

(58) Field of Classification Search
CPC .... G06F 3/0604; G06F 3/0656; G06F 3/0659; G06F 3/0679; G06F 9/5016; G06F 12/0871
See application file for complete search history.

(56) References Cited

U.S. PATENT DOCUMENTS

| 2014/0331001 | A1 | 11/2014 | Liu et al. | |
| 2015/0324118 | A1* | 11/2015 | McCambridge | G06F 3/0613 710/5 |
| 2016/0266928 | A1* | 9/2016 | Rimoni | G06F 9/4881 |
| 2017/0075572 | A1* | 3/2017 | Utevsky | G06F 3/0659 |

* cited by examiner

*Primary Examiner* — Hal Schnee
(74) *Attorney, Agent, or Firm* — Harness, Dickey & Pierce, P.L.C.

(57) ABSTRACT

Various example embodiments herein disclose a method of managing input/output (I/O) queues by a Non-Volatile Memory Express (NVMe) controller. The method includes receiving a single command from a host to perform a creation of the I/O queues or deletion of the I/O queues. Further, the method includes processing a queue identifier, a queue size, and combination of the queue identifier and queue size indicated in the single command. Furthermore, the method includes performing the creation of the I/O queues or deletion of the I/O queues, in a host memory.

13 Claims, 11 Drawing Sheets

600a

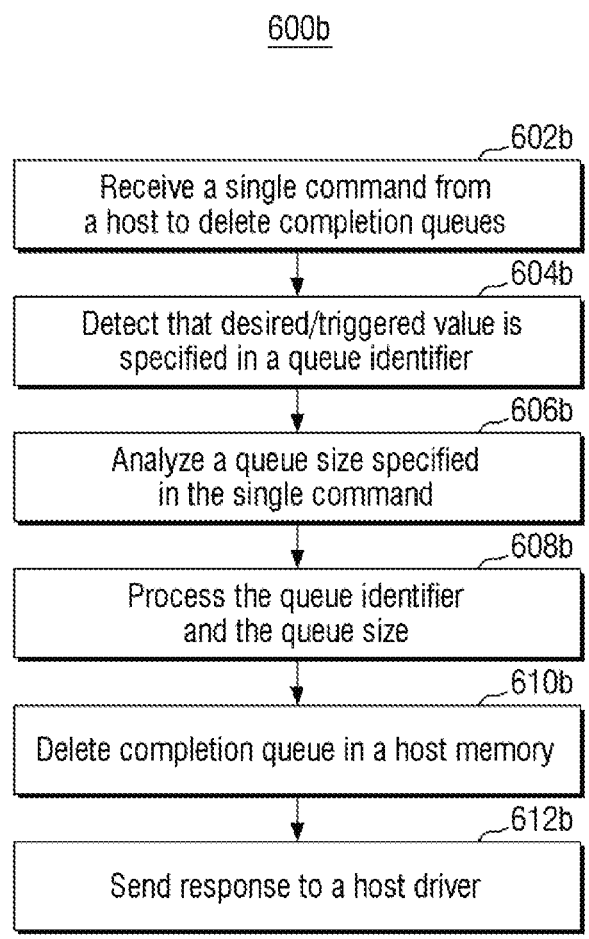

METHOD OF MANAGING INPUT/OUTPUT(I/O) QUEUES BY NON-VOLATILE MEMORY EXPRESS(NVME) CONTROLLER

CROSS-REFERENCE TO RELATED APPLICATION

This U.S. non-provisional application claims the benefit of priority under 35 U.S.C § 119 to Indian Provisional Patent Application No. 3544/CHE/2015 entitled "NVM Express: Improved method to Create and Delete I/O queues" filed on Jul. 10, 2015 in the Office of the Controller General of Patents, Designs & Trade Marks (CGPDTM), and Indian Patent Application No. 3544/CHE/2015 entitled "Method of managing input/output (I/O) queues by Non-Volatile Memory Express (NVMe) controller" filed on Sep. 22, 2015 in the CGPDTM, the contents of both of which are herein incorporated by reference in their entireties.

BACKGROUND

1. Field

The present inventive concepts relate to a Non-Volatile Memory Express (NVMe), and more particularly to methods, systems, and/or apparatuses for managing input/output (I/O) queues by a Non-Volatile Memory Express (NVMe) controller.

2. Description of the Related Art

Typically, a relatively new interface standard deals with a local non-volatile memory access is Non-Volatile Memory Express (NVMe), sometimes referred to as a Non-Volatile Memory Host Controller Interface Specification. The NVMe is a register-level interface that allows a host application to communicate with a non-volatile memory subsystem. This register-level interface is optimized for enterprise-level and client-level solid state drives (SSDs), which are typically attached to a Peripheral Component Interconnect Express (PCIe) bus interface. The NVMe provides direct input/output (I/O) access to local non-volatile memory. Using NVMe, the latency of read and write operations is reduced compared to the latencies seen while connecting over traditional I/O interfaces, such as Serial-attached Small Computer System Interface (SCSI) or Serial Advanced Technology Attachment (SATA).

However, the present NVM Express specification 1.2 supports 1 to 65,535 I/O queues. During initialization, the host has to send multiple (1 to a maximum of 65,535) create I/O Submission Queue and Create I/O Completion Queue commands to create I/O queues, which highly impacts the time required to initialize the controller. During shut down of the controller, the host has to send multiple (1 to a maximum of 65,535) Delete I/O Submission Queue and Delete I/O Completion Queue commands to delete the previously created I/O queues, which highly impacts the time required to shut down the host controller. For example, an NVMe controller may first fetch the command, process the command, and then sends the response entry to the host NVMe Driver. If the NVMe controller processes the creation or deletion of these commands one by one, it requires a lot of time and resources, and greatly increases the time required to boot up, hibernate, and/or shutdown, the computing device that the NVMe system is installed in, and impacts the amount of power used (e.g., low power conditions).

The above information is presented as background information only to help the reader to understand the present invention. Applicants have made no determination and make no assertion as to whether any of the above might be applicable as Prior Art with regard to the present application.

SUMMARY

An aspect of the present inventive concepts provides a method of managing input/output (I/O) queues by a Non-Volatile Memory Express (NVMe) controller.

Another object of the present inventive concepts is to provide a method for receiving a single command from a host to perform a creation of I/O submission queues.

Still another object of the present inventive concepts is to provide a method for receiving a single command from a host to perform a creation of I/O completion queues.

Still another object of the present inventive concepts is to provide a method for receiving a single command from a host to perform a deletion of I/O completion queues.

Still another object of the present inventive concepts is to provide a method for receiving a single command from a host to perform a deletion of I/O submission queues.

Aspects of the present inventive concepts are not limited to the above-mentioned aspects, and other aspects that have not been mentioned will be clearly understood by those skilled in the art from the following description.

In accordance with at least one example embodiment of the present inventive concepts, a method of managing input/output (I/O) queues by a Non-Volatile Memory Express (NVMe) controller includes receiving a single command from a host to perform at least one of creating I/O queues and deleting I/O queues, processing at least one of a queue identifier and a queue size included in the single command, and performing the at least one of creating the I/O queues and deleting the I/O queues, in a host memory based on results of the processing.

In accordance with at least one example embodiment of the present inventive concepts, a Non-Volatile Memory Express (NVMe) controller for creating input/output (I/O) queues is configured to receive a single command from a host to create a plurality of I/O queues, process at least one of a queue identifier and a queue size included in the single command, and perform the creation of I/O queues in a host memory based on results of the processing.

In accordance with at least one example embodiment of the present inventive concepts, a Non-Volatile Memory Express (NVMe) controller for deleting input/output (I/O) queues, wherein said NVMe controller is configured to receive a single command from a host to delete a plurality of I/O queues, process at least one of a queue identifier and a queue size included in the single command, and perform the deletion of I/O queues in a host memory based on results of the processing.

In accordance with at least one example embodiment of the present inventive concepts, a method for controlling a Non-Volatile Memory Express (NVMe) controller is provided, the method including receiving a NVMe command from a host related to a plurality of input/output (I/O) queues, the NVMe command including a queue identifier field, determining whether the queue identifier field has stored a desired value, deleting the plurality of I/O queues in a host memory based on results of the queue identifier, and transmitting a response to the host, the response including results of the deleting.

BRIEF DESCRIPTION OF THE DRAWINGS

The foregoing and other features of inventive concepts will be apparent from the more particular description of non-limiting example embodiments of inventive concepts, as illustrated in the accompanying drawings in which like reference characters refer to like parts throughout the different views. The drawings are not necessarily to scale, emphasis instead being placed upon illustrating principles of inventive concepts. In the drawings:

FIG. 6B is a flow diagram illustrating a method for deleting I/O completion queues by an NVMe controller according to at least one example embodiment;

DETAILED DESCRIPTION

Figure 1:
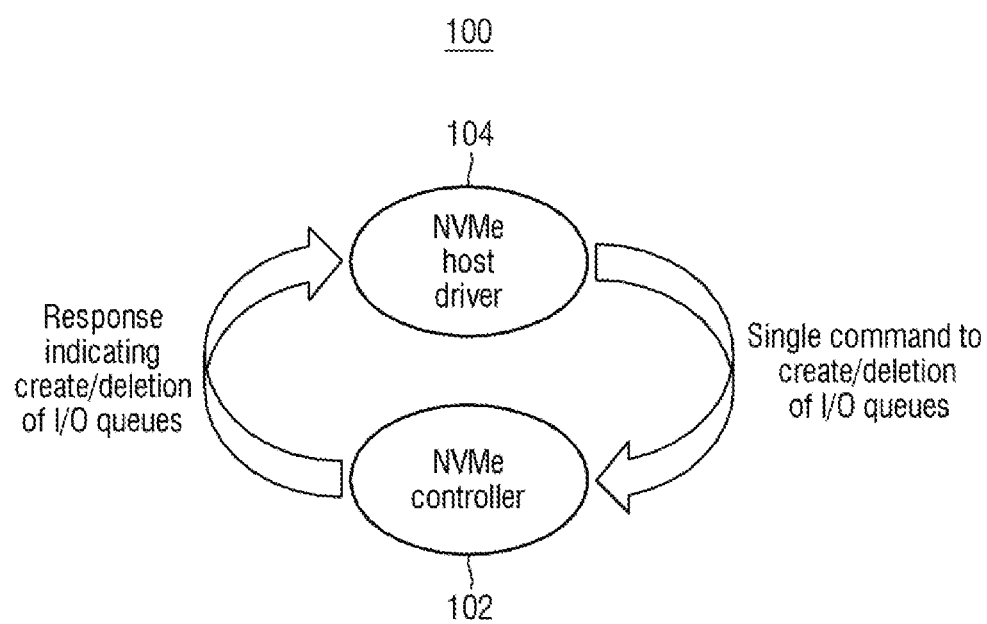
FIG. 1 illustrates a simplified view of a system for managing input/output (I/O) queues by a Non-Volatile Memory Express (NVMe) controller, according to at least one example embodiment.

Advantages and features of various example embodiments of the present inventive concepts and methods of accomplishing the same may be understood more readily by reference to the following detailed description of example embodiments and the accompanying drawings. The present inventive concepts may, however, be embodied in many different forms and should not be construed as being limited to the example embodiments set forth herein. Rather, these example embodiments are provided so that this disclosure will be thorough and complete and will fully convey the concepts of the inventive concepts to those skilled in the art, and the present inventive concepts will only be defined by the appended claims. In the drawings, the thickness of layers and regions are exaggerated for clarity.

It will be understood that when an element or layer is referred to as being "on" or "connected to" another element or layer, it can be directly on or connected to the other element or layer or intervening elements or layers may be present. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

The use of the terms "a" and "an" and "the" and similar referents in the context of describing the various example embodiments of the inventive concepts (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

The example embodiments of the inventive concepts are not intended to limit the scope of the present inventive concepts but cover all changes and modifications that can be caused due to a change in manufacturing process. Thus, regions shown in the drawings are illustrated in schematic form and the shapes of the regions are presented simply by way of illustration and not as a limitation.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Throughout the description herein, the terms NVMe controller and controller will be used interchangeably.

Various example embodiments herein provide a method of managing input/output (I/O) queues by a Non-Volatile Memory Express (NVMe) controller. The method includes receiving a single command from a host to perform the creation of I/O queues and/or deletion of I/O queues. Further, the method includes processing a queue identifier, a queue size, and/or combination of the queue identifier and queue size indicated in the single command. Furthermore, the method includes performing the creation of the I/O queues and/or the deletion of the I/O queues, in a host memory.

In at least one example embodiment, the I/O queues are completion queues.

In at least one example embodiment, the I/O queues are submission queues.

In at least one example embodiment, the method includes detecting and/or determining that a desired value (e.g., 0 h) is specified in the queue identifier. Further, the method includes analyzing the single command to determine the queue size specified in the single command. Further, the method includes creating the I/O queues based on the specified queue size.

In at least one example embodiment, the method includes detecting and/or determining that a desired value (e.g., 0 h) is specified in the queue identifier. Further, the method includes analyzing the single command to determine the queue size specified in the single command. Further, the method includes deleting number of the I/O queues based on the specified queue size.

In at least one example embodiment, the method includes detecting that a desired value (e.g., 0 h) is specified in the queue identifier. The method includes deleting the I/O queue present in the host memory.

In at least one example embodiment, the method includes determining that the queue size specified in the single command is within a desired value range, such as the I/O queue limit supported by the NVMe controller. The method includes analyzing the single command to determine the queue size specified in the single command.

Various example embodiments herein provide a NVMe controller for creating the I/O queues. The NVMe controller is configured to receive a single command from the host to perform the creation of the I/O queues. Further, the NVMe controller is configured to process the queue identifier, the queue size and/or combination of the queue identifier and queue size indicated in the single command. Furthermore, the NVMe controller is configured to perform the creation of I/O queues in the host memory.

Various example embodiments herein provide the NVMe controller for deleting the I/O queues. The NVMe controller is configured to receive a single command from the host to perform the deletion of the I/O queues. Further, the NVMe controller is configured to process the queue identifier, the queue size, and/or combination of the queue identifier and queue size indicated in the single command. Furthermore, the NVMe controller is configured to perform the deletion of the I/O queues in the host memory.

In existing systems, the NVMe queues are created and/or deleted one by one (e.g., one queue at a time). The queues may be created or deleted synchronously or asynchronously. In other words the host NVMe driver may wait for a response for a previously issued queue creation command (e.g., synchronous queue creation/deletion), or it can issue the next queue creation or deletion command without waiting for a response to the previous command (e.g., asynchronous queue creation/deletion). If an NVMe controller processes the creation or deletion of these queue command one by one, it takes a lot of time due to the large number of queues that are typically created using the NVMe protocol, and this time taken is a critical limitation in the boot up, hibernation, and shutdown process of a computing device that has a NVMe memory subsystem. Further, the creation and deletion of queues in the conventional manner consumes more power and may, for example, greatly and unnecessarily impact battery life of a computing device that uses NVMe based memory.

Unlike conventional systems, at least one example embodiment according to the inventive concepts provide a single command to create I/O queues. The proposed method provides a lightweight solution to create multiple I/O queues with a single admin command instead of using multiple commands. This feature helps to improve the time required to initialize the controller, which in-turn will improve the time taken for the host initialization, resume the host when it exits hibernation (and/or a reduced power state), and improve the error recovery from the host.

Unlike conventional systems, at least one example embodiment according to the inventive concepts provides a reduced (and/or minimum) number of commands to the delete I/O queues. At least one example embodiment provides a lightweight solution to delete all I/O queues with the use of a single admin command instead of using multiple commands. This feature helps to improve the time required to shut down the controller, which in-turn will improve the time taken for the host shut down, the host to enter hibernation mode (and/or a reduced power state) and improves the error recovery from host. At least one example embodiment utilizes the single command to delete up to 65, 535 I/O queues (e.g., 64K I/O queues).

Unlike conventional systems, at least one example embodiment according to the inventive concepts does not create submission and completion First-In-First Out (FIFO) units (e.g., FIFO queues) in the NVMe controller to manage incoming commands from the host. At least one example embodiment according to the inventive concepts does not deal with (e.g., use and/or require) a command processing order. At least one example embodiment according to the inventive concepts uses a single command to create up to 65,535 I/O queues.

Referring now to the drawings and more particularly to FIGS. 1 through 6D, where similar reference characters denote corresponding features consistently throughout the figure, there are shown various example embodiments.

FIG. 1 illustrates a simplified view of a system 100 for managing input/output (I/O) queues by the NVMe controller 102, according to at least one example embodiment as disclosed herein. The system 100 includes the NVMe controller 102 and an NVMe host driver 104. The NVMe controller 102 communicates with the NVMe host driver 104 over a wired communication and/or a wireless communication network. In at least one example embodiment, the NVMe controller 102 is a scalable host controller interface designed to address the needs of Enterprise-level and Client-level systems that utilize PCI Express-based (or other) solid state drives (SSDs). The scalable host controller interface provides an increased and/or optimized command issue and completion path. It includes support for parallel operation by supporting up to 64K (e.g., 65,536) commands within the I/O Queue. Additionally, support has been added for many Enterprise capabilities like end-to-end data protection (compatible with T10 Data Integrity Field (DIF) and DIX standards), enhanced error reporting, virtualization, etc.

According to at least one example embodiment, the NVMe controller 102 is operated based on a submission and completion queue procedure. A command is placed by a host application into submission queues associated with the NVMe controller 102. Upon completion, the command is placed into the associated completion queues by an internal controller. The submission queue may utilize the same completion queues. The submission and completion queues are allocated in the host memory according to at least one example embodiment, but is not limited thereto.

The NVMe host driver 104 is configured to send a single command to perform the creation of the I/O queues and/or deletion of the I/O queues to the NVMe controller 102. Based on the sending of the single command to the NVMe controller 102, the NVMe controller 102 is configured to receive the single command. After receiving the single command, the NVMe controller 102 is configured to process the queue identifier, the queue size, and/or a combination of the queue identifier and queue size indicated by or included in the single command. After processing the queue identifier and the queue size, the NVMe controller 102 is configured to perform the creation of the I/O queues or the deletion of the I/O queues in the host memory (e.g., create the I/O queues or delete the I/O queues) in accordance with the received single command.

According to at least one example embodiment, the I/O queues are the completion queues. According to at least one example embodiment, the I/O queues are the submission queues. According to at least one example embodiment, the I/O queues are a combination of completion and submission queues.

According to at least one example embodiment, the submission queues may be a circular buffer with a fixed slot size that the host uses to submit commands for execution by the NVMe controller 102, but is not limited thereto. The host updates an appropriate doorbell register of the NVMe controller 102 associated with the submission queue when there is a new command to execute. The previous doorbell register value is overwritten in the NVMe controller 102, when there is anew doorbell register write associated with a given submission queue. The NVMe controller 102 fetches the single command from the host memory in an order specified by a submission queue register.

According to at least one example embodiment, the completion queues are a circular buffer with a fixed slot size used to post status for a completed command, but is not limited thereto. The completed command is uniquely identified, for example, by using a combination of an associated submission queue identifier and a command identifier that is assigned by the host application.

According to at least one example embodiment, ahead pointer of the completion queues may be updated by the host application after it has processed completion queue entries indicating the last free completion queue entry. A Phase (P) bit is defined in a completion queue entry to indicate whether an entry has been newly posted without consulting a register. This may enable host application to determine whether the new entry was posted as part of the previous or current round of completion notifications. Specifically, before or during each round through the completion queue locations, the NVMe controller 102 may invert the phase bit (e.g., set the phase bit to "0") to indicate that no new completion queue entries have been newly posted since the start of the processing of the completion notifications by the NVMe controller 102.

According to at least one example embodiment, an application employed by the host may create the submission queues and the completion queues up to the maximum supported by the NVMe controller 102. Typically the number of submission queues created is based on the system configuration (e.g. a number of available computer processors and/or processing cores present in the system, etc.) and anticipated workload of the system. For example, on a four core computer processor based system, there may be a submission queue 101/completion queue 102 pair for each of the four cores to avoid locking problems between the four cores and to ensure that data structures are created in the appropriate processor core's cache.

According to at least one example embodiment, the multiple queues are created by sending the single command, desired and/or required information is carried by Physical Region Page1 (PRP1)/Physical Region Page2 (PRP2) or any other field in command, where information like Queue Base address, Interrupt Vector, Queue Size etc. will be provided by a host system.

Figure 2:
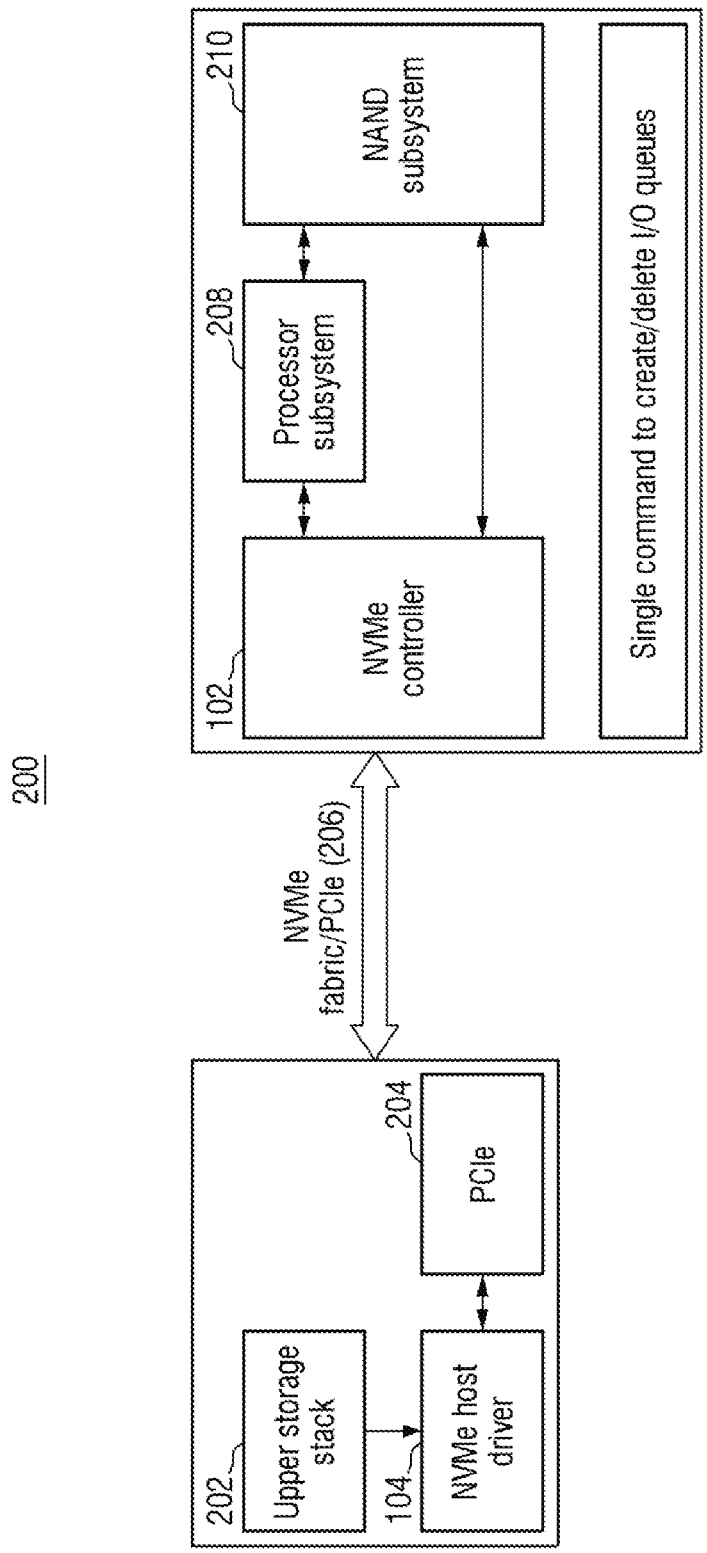
FIG. 2 illustrates a high level overview of a system for managing I/O queues by a NVMe controller according to at least one example embodiment.

FIG. 2 illustrates a high level overview of a system 200 for managing the I/O queues by the NVMe controller 102, according to at least one example embodiment as disclosed herein. The system 200 includes the NVMe controller 102, the NVMe host driver 104, an upper storage stack 202, a PCIe bus 204, an NVMe Fabric/PCIe 206, a processor subsystem 208, and a NAND subsystem 210. The NVMe controller 102 communicates with the NVMe host driver 104 over the NVMe Fabric/PCIe 206. The NVMe Fabric/PCIe 206 is defined by a Non-Volatile Memory Host Controller Interface (NVMHCI) working group. The upper storage stack 202 communicates with the NVMe host driver 104. In at least one example embodiment, the upper storage stack 202 is configured to route the write command and device address to a data storage device (DSD) (not shown) where the write command and device address are received by a host interface of the DSD for processing by an internal controller of the DSD (not shown). The NVMe host driver 104 communicates with the PCIe bus 204 in a bidirectional manner. The NVMe controller 102 communicates with the processor subsystem 208 in a bidirectional manner. The NVMe controller 102 communicates with the NAND subsystem 210 in a bidirectional manner. The NAND subsystem 210 communicates with the processor subsystem 208 in a bidirectional manner.

The NVMe host driver 104 is configured to send the single command to perform the creation of the I/O queues and/or deletion of the I/O queues to the NVMe controller 102. Based on the sending of the single command to the NVMe controller 102, the NVMe controller 102 is configured to receive the single command over the NVMe Fabric/PCIe 206. After receiving the single command, the NVMe controller 102 is configured to process the queue identifier, the queue size, and/or combination of the queue identifier and queue size included and/or indicated in the single command. After processing the queue identifier and the queue size, the NVMe controller 102 is configured to perform the creation of the I/O queues, or the deletion of the I/O queues, in the host memory.

FIG. 1 and FIG. 2 show a limited overview of the system 100 and the system 200, but it is to be understood that other example embodiments are not limited thereto. Further, the system 100 and the system 200 may include any number of other hardware or software components communicating with each other. For example, the components may be, but are not limited to, a process running in the controller or processor, an object, an executable process, a thread of execution, a program, or a computer. By way of illustration, both an application running on a device and the device itself may be a component.

Figure 3A:
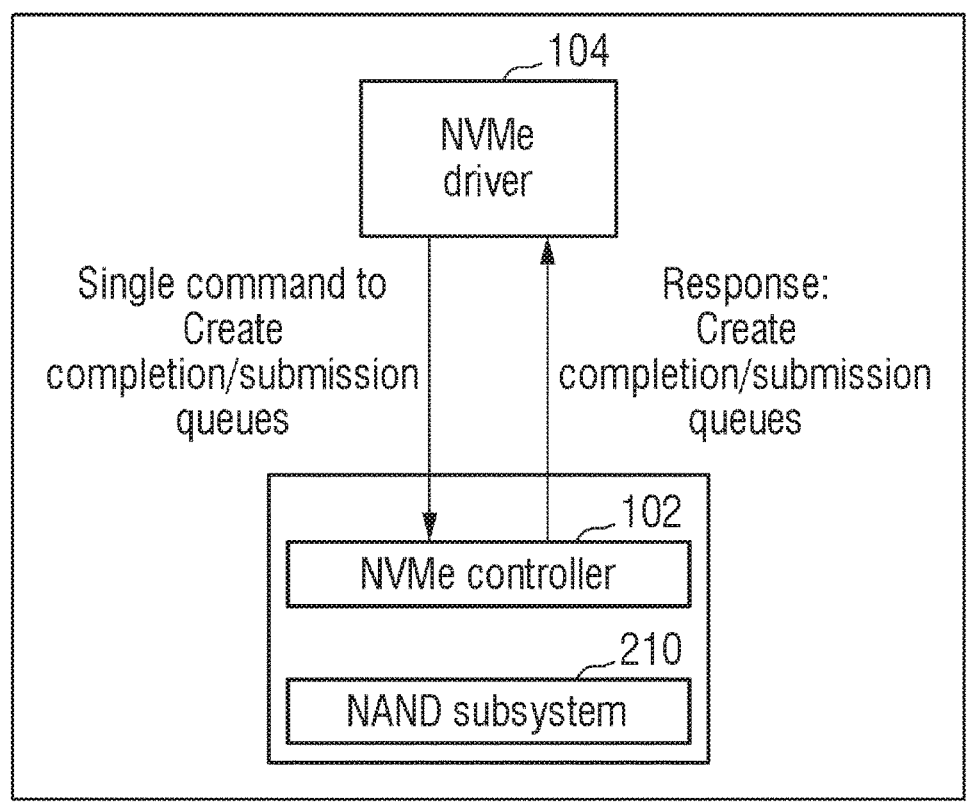
FIG. 3A illustrates a high level overview a system for creating I/O completion/submission queues by a NVMe controller according to at least one example embodiment.

FIG. 3A illustrates a high level overview of a system for creating the I/O completion/submission queues by the NVMe controller 102, according to at least one example embodiment as disclosed herein. In at least one example embodiment, during creation of the I/O completion queues, the NVMe host driver 104 is configured to send the single command to the NVMe controller 102. After receiving the single command from the NVMe host driver 104, the NVMe controller 102 is configured to identify that a desired value (e.g., 0 h) is specified in the queue identifier. Or in other words, the NVMe controller 102 is configured to determine whether a desired value, such as 0 h, is present in the queue identifier. After identifying (and/or determining) that the queue identifier includes the desired value (e.g., a triggering value), the NVMe controller 102 is configured to determine whether the queue size specified in the single command is within a desired value range, such as the I/O queue limit supported by the NVMe controller 102. If the NVMe controller 102 does not support the queue size specified in the single command within I/O queue limit, the NVMe controller 102 is configured to transmit, provide, and/or pop-up an error message. If the NVMe controller 102 supports the queue size specified in the single command within I/O queue limit then the NVMe controller 102 is configured to process the queue identifier and the queue size. Based on the processing of the queue identifier and the queue size, the NVMe controller 102 is configured to create the completion queues in the host memory. Based on creating the completion queue in the host memory, the NVMe controller 102 is configured to send a response to the host driver 104.

According to at least one other example embodiment, during creation of the I/O submission queues, the NVMe host driver 104 is configured to send the single command to the NVMe controller 102. After receiving the single command from the NVMe host driver 104, the NVMe controller 102 is configured to identify (and/or determine) that that a desired/triggering value (e.g., 0 h) is specified in the queue identifier. After identifying (and/or determining) that a desired value (and/or triggering value) is specified in the queue identifier, the NVMe controller 102 is configured to determine whether the queue size specified in the single command is within a desired value range, such as the I/O queue limit supported by the NVMe controller 102. If the NVMe controller 102 does not support the queue size specified in the single command within I/O queue limit, the NVMe controller 102 is configured to transmit, provide, and/or pop-up the error message. If the NVMe controller 102 supports the queue size specified in the single command within the I/O queue limit, the NVMe controller 102 is configured to process the queue identifier and the queue size. Based on the processing of the queue identifier and the queue size, the NVMe controller 102 is configured to create the submission queues in the host memory. Based on creating the submission queues in the host memory, the NVMe controller 102 is configured to send a response to the host driver 104.

Unlike conventional systems, the proposed system provides decreased and/or a minimum of commands to create the completion/submission I/O queues. The proposed method provides a lightweight solution to create multiple completion/submission I/O queues with a single administrative command instead of using multiple commands. This feature helps to improve the time required to initialize the controller, which in-turn will improve the time taken for host initialization, resume the system from a hibernation and/or reduced power state, and improve the error recovery from the host.

Figure 3B:
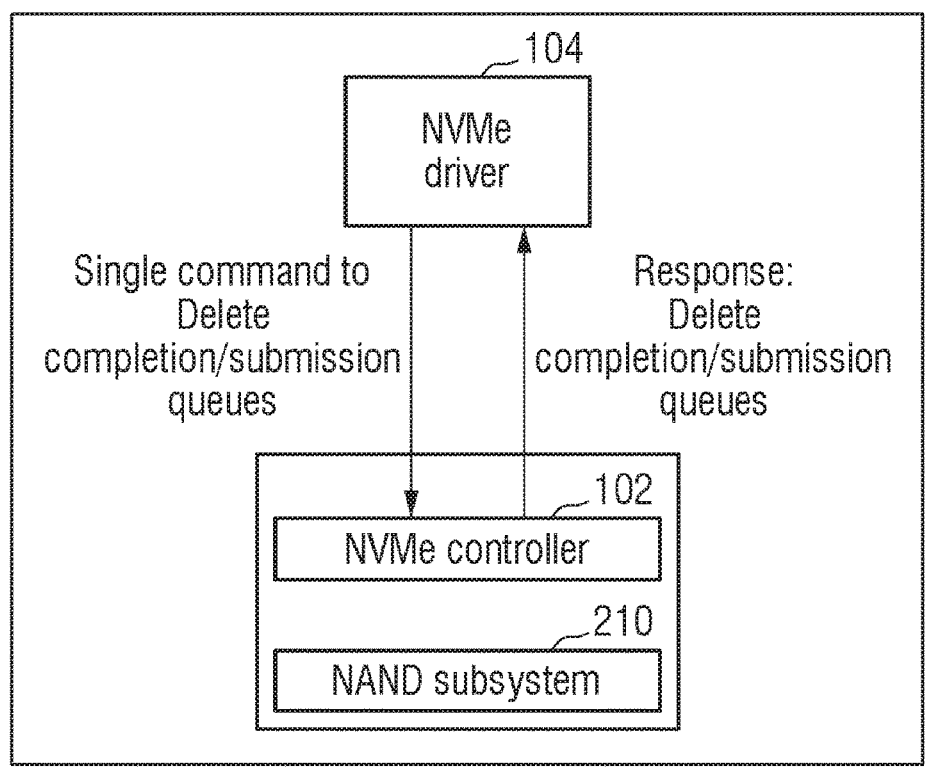
FIG. 3B illustrates a high level overview a system for deletion of I/O completion/submission queues by a NVMe controller according to at least one example embodiment.

FIG. 3B illustrates a high level overview of the system for deletion of the I/O completion/submission queues by the NVMe controller 102, according to at least one example embodiments as disclosed herein. In at least one example embodiment, during deletion of the I/O queues, the NVMe host driver 104 is configured to send the single command to the NVMe controller 102. After receiving the single command from the NVMe host driver 104, the NVMe controller 102 is configured to detect (and/or determine) that a desired and/or triggering value (e.g., 0 h) is specified in the queue identifier. Based on detecting (and/or determining) that the desired/triggering value is specified in the queue identifier, the NVMe controller 102 is configured to delete all I/O queues in the host memory. Based on the results of the deleting all I/O queues in the host memory, the NVMe controller 102 is configured to send a response to the host driver 104.

According to at least one other example embodiment, during the deletion of the I/O queues, the NVMe host driver 104 is configured to send a single command to the NVMe controller 102. After receiving the single command from the NVMe host driver 104, the NVMe controller 102 is configured to detect (and/or determine) that a desired and/or triggering value (e.g., 0 h) is specified in the queue identifier. After detecting (and/or determining) that the desired/triggering value is specified in the queue identifier, the NVMe controller 102 is configured to analyze the queue size specified in the single command. Based on the results of the analyzing the queue size specified in the single command, the NVMe controller 102 is configured to process the queue identifier and the queue size. After processing the queue identifier and the queue size, the NVMe controller 102 is configured to delete the I/O queues in the host memory. After deleting the I/O queues in the host memory, the NVMe controller 102 is configured to send a response to the host driver 104.

Unlike conventional systems, various example embodiments of the present inventive concepts provide a reduced, decreased, and/or minimum number of commands to perform the deletion of the completion/submission I/O queues. At least one example embodiment provides a lightweight solution to delete all or a partial number of the completion/submission I/O queues with the single admin command instead of using multiple commands. This feature helps to improve the time required to shut down the controller, which in-turn improves the time taken for the host (e.g., the computing device, etc.) to shut down, the host hibernation and improve the error recovery from the host.

Figure 4:
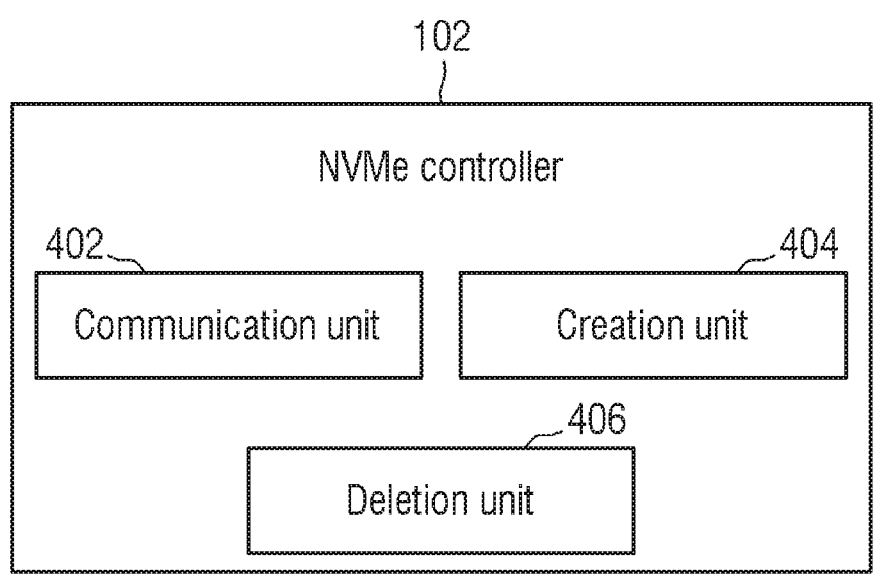
FIG. 4 illustrates a block diagram of a NVMe controller according to at least one example embodiment.

FIG. 4 illustrates a block diagram of the NVMe controller 102, according to at least one example embodiment as disclosed herein. In at least one example embodiment, the NVMe controller 102 includes a communication unit 402, a creation unit 404, and a deletion unit 406. In at least one example embodiment, during creation of the completion/submission I/O queue, the NVMe host driver 104 sends a single command to the NVMe controller 102. Based on the sending of the single command from the NVMe host driver 104, the communication unit 402 receives the single command from the NVMe host driver 104. After receiving the single command from the NVMe host driver 104, the creation unit 404 identifies (and/or determines) that a desired and/or triggering value (e.g., 0 h) is specified in the queue identifier. After identifying (and/or determining) that the desired/triggering value is specified in the queue identifier, the creation unit 404 determines whether the queue size specified in the single command is within a desired value range, such as the I/O queue limit supported by the NVMe controller 102. If the NVMe controller 102 does not support the queue size specified in the single command then the communication unit 402 sends an error message to the NVMe controller 102. The NVMe controller 102 will then transmit, display, pop-up, etc., the error message to the user. If the NVMe controller 102 supports the queue size specified in the single command within I/O queue limit then, the creation unit 404 processes the queue identifier and the queue size. Based on the results of the processing of the queue identifier and the queue size, the creation unit 404 creates the completion/submission I/O queues in the host memory.

According to at least one other example embodiment, during the deletion of the completion/submission I/O queues, the NVMe host driver 104 sends the single command to the NVMe controller 102. After sending the single command from the NVMe host driver 104, the communication unit 402 receives the single command from the NVMe host driver 104. After receiving the single command from the NVMe host driver 104, the deletion unit 406 detects that a desired and/or triggering value (e.g., 0 h) is specified in the queue identifier. Based on the results of detecting that the desired/triggering value is specified in the queue identifier, the deletion unit 406 deletes all completion/submission I/O queues in the host memory. Based on the results of the deletion operation of some or all of the completion/submission I/O queues in the host memory, the communication unit 402 sends the response to the host driver 104.

According to at least one example embodiment, during deletion of the completion/submission I/O queue, the NVMe host driver 104 sends the single command to the NVMe controller 102. After sending the single command from the NVMe host driver 104, the communication unit 402 receives the single command from the NVMe host driver 104. After receiving the single command from the NVMe host driver 104, the deletion unit 406 detects a desired and/or triggering value (e.g., 0 h) is specified in the queue identifier. After detecting that the desired/triggering value is specified in the queue identifier, the deletion unit 406 analyzes the queue size specified in the single command. Based on the results of analyzing whether the queue size specified in the single command, the deletion unit 406 processes the queue identifier and the queue size. After processing the queue identifier and the queue size, the deletion unit 406 deletes some or all of the completion/submission I/O queues in the host memory. After deleting the completion/submission I/O queues in the host memory, the communication unit 402 sends a response to the host driver 104 based on the results of the deletion operation.

Although FIG. 4 shows example components of the NVMe controller 102, the example embodiments are not limited thereto. In other implementations, the NVMe controller 102 may include fewer components, different components, differently arranged components, or additional components than depicted in the FIG. 4. Additionally or alternatively, one or more components of the NVMe controller 102 may perform functions described as being performed by one or more other components of the NVMe controller 102.

controller 102, then at step 508a, the method 500a includes analyzing the queue size specified in the single command. In at least one example embodiment, the method 500a allows the creating unit 404 to analyze the queue size specified in the single command. If it is determined at step 506A that the queue size specified in the single command is not within a desired value range, such as the I/O queue limit supported by the NVMe controller 102, then at step 510a, the method 500a includes sending an error message to the NVMe controller 102. In at least one example embodiment, the method 500a allows the communication unit 402 to send the error message to the NVMe controller 102. At step 512a, the method 500a includes analyzing PRP value specified in the single command. In at least one example embodiment, the method 500a allows the creating unit 404 to analyze the PRP value specified in the single command. For example, the "CDW10.QSIZE" field of the create I/O completion queue command sets the size of the queue to be created. If the "CDW10.QID" (e.g., the completion queue identifier field of the create I/O completion queue command) value is 0, the CDW10.QSIZE

TABLE 1

List of Completion Queue Entries

| | | Bit | | | | | |
|---|---|---|---|---|---|---|---|
| | 127:64 | 63:48 | 47:32 | 31:16 | 15:02 | 01 | 00 |
| Description | PRP Entry 1 (PRP1) | Queue Size (QSIZE) | Queue identifier (QID) | Interrupt Vector (IV) | Reserved | Interrupts Enabled (IEN) | Physically contiguous (PC) |
| | PRP Entry 1 (PRP1) | Queue Size (QSIZE) | Queue identifier (QID) | Interrupt Vector (IV) | Reserved | Interrupts Enabled (IEN) | Physically contiguous (PC) |
| | PRP Entry 1 (PRP1) | Queue Size (QSIZE) | Queue identifier (QID) | Interrupt Vector (IV) | Reserved | Interrupts Enabled (IEN) | Physically contiguous (PC) |
| | PRP Entry 1 (PRP1) | Queue Size (QSIZE) | Queue identifier (QID) | Interrupt Vector (IV) | Reserved | Interrupts Enabled (IEN) | Physically contiguous (PC) |
| | PRP Entry 1 (PRP1) | Queue Size (QSIZE) | Queue identifier (QID) | Interrupt Vector (IV) | Reserved | Interrupts Enabled (IEN) | Physically contiguous (PC) |
| | PRP Entry 1 (PRP1) | Queue Size (QSIZE) | Queue identifier (QID) | Interrupt Vector (IV) | Reserved | Interrupts Enabled (IEN) | Physically contiguous (PC) |

Figure 5A:
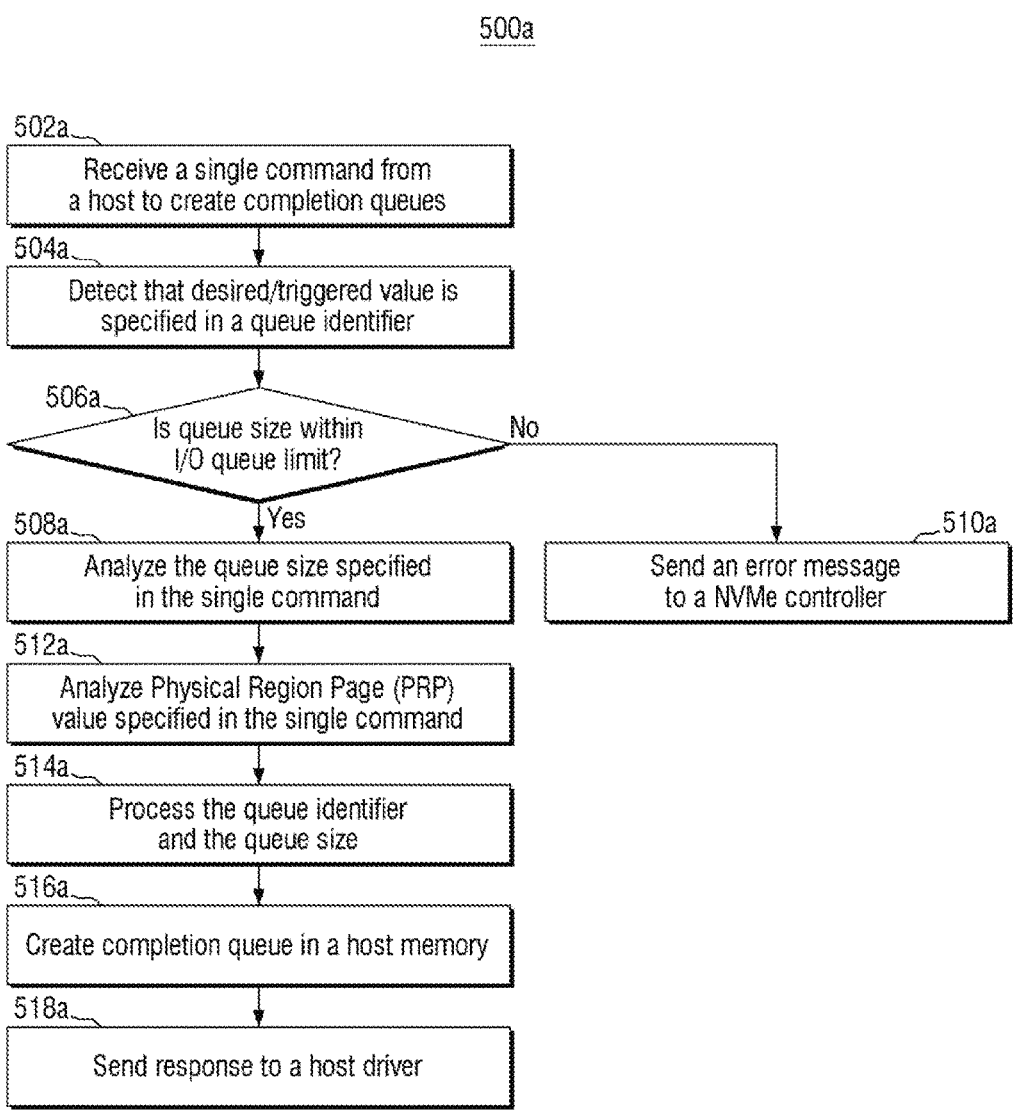
FIG. 5A is a flow diagram illustrating a method for creating I/O completion queues by a NVMe controller according to at least one example embodiment.

FIG. 5A is a flow diagram illustrating a method 500a for creating the I/O completion queue by the NVMe controller 102, according to at least one example embodiment as disclosed herein. In at least one example embodiment, with a single create I/O completion queue command, a plurality of completion queues, up to a maximum of 64K I/O completion queues, may be created.

At step 502a, the method 500a includes receiving a single command from the host. In at least one example embodiment, the method 500a allows the communication unit 402 to receive the single command from the host. At step 504a, the method 500a includes detecting a desired and/or triggering value (e.g., 0 h) is specified in the queue identifier. In at least one example embodiment, the method 500a allows the creation unit 404 to detect a desired and/or triggering value (e.g., 0 h) is specified in the queue identifier. For example, if the CDW10.QID (e.g., completion queue identifier) field of the create I/O completion queue command has a desired and/or triggering value specified, such as 0 h, then the NVMe controller 102 should interpret that this command is intended to create multiple I/O completion queues in the host memory.

If it is determined at step 506A that the queue size specified in the single command is within a desired value range, such as the I/O queue limit supported by the NVMe field indicates the Number of Queues (NQ) to be created with this command. If CDW10.QID is not 0, the CDW10.QSIZE field indicates the Queue Size (QSIZE). The Number of Queues (NQ) field indicates the number of completion queues to be created with this command. If the value specified exceeds the Number of Queues supported by the controller 102, the controller 102 should return an error of Invalid Number of Queues. This is a 0's based value. The create I/O completion queue will return a value, such as 3 h, in a command specific status, which indicates invalid the number of queues, if the values specified in NQ exceeds the Number of Queues supported by the controller 102. The Number of Queues can be retrieved using the "Get Features" command. For the "PRP1" field if the CDW10.QID field is net to 0, then the PRP1 field specifies a 64-bit base memory address pointer of the array of completion queue entries as defined below (but not limited to table below):

At step 514a, the method 500a includes processing the queue identifier and the queue size. In at least one example embodiment, the method 500a allows for the creating unit 404 to process the queue identifier and the queue size. At step 516A, the method 500a includes creating the completion queues in the host memory. In at least one example embodiment, the method 500a allows for the creating unit 404 to create I/O completion queues in the host memory based on the queue size. For example, if the queue size specified as 10, then 10 completion queues will be created. At step 518a, the method 500a includes sending responses to the host driver 104. In at least one example embodiment, the method 500a allows the communication unit 402 to send responses to the host driver 104. The response corresponds to the creation of I/O completion queues in the host memory.

Figure 5B:
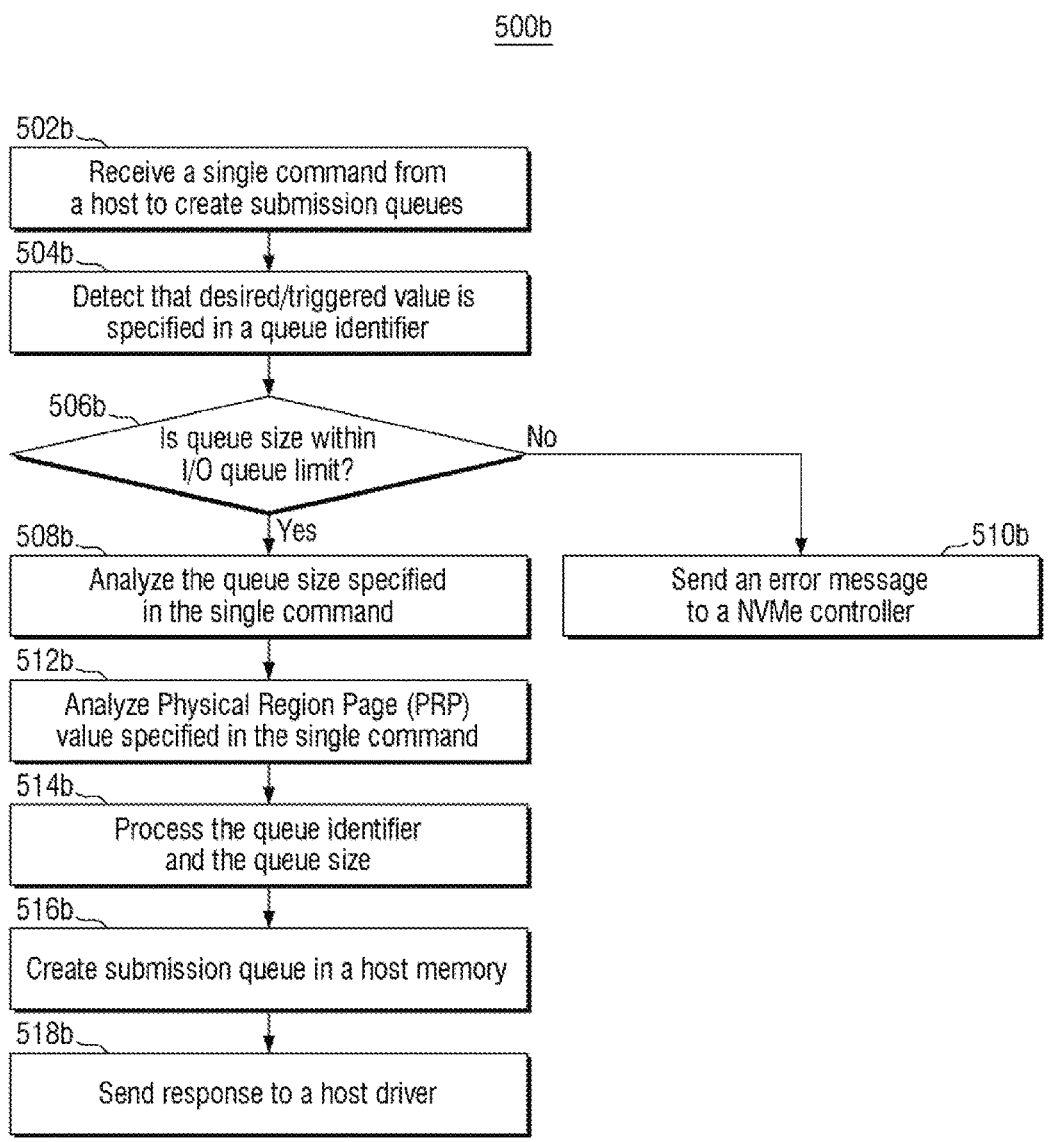
FIG. 5B is a flow diagram illustrating a method for creating I/O submission queues by a NVMe controller according to at least one example embodiment.

The various actions, acts, blocks, steps, and the like in the method 500a may be performed in the order presented, in a different order or simultaneously. Further, in some example embodiments, some actions, acts, blocks, steps, and the like may be omitted, added, modified, skipped, and the like without departing from the scope of the invention, FIG. 5B is a flow diagram illustrating the method 500b for creating the I/O submission queues by the NVMe controller 102, according to at least one example embodiment as disclosed herein. In at least one example embodiment, with the single create I/O submission queue command, a desired number of I/O submission queues, up to a maximum of 64K I/O submission queues, may be created. At step 502b, the method 500b includes receiving the single command from the host. In at least one example embodiment, the method queue size specified in the single command. At step 512b, the method 500b includes analyzing PRP value specified in the single command. In at least one example embodiment, the method 500b allows the creating unit 404 to analyze the PRP value specified in the single command.

For example, if the CDW10.QID field is 0, the CDW10.QSIZE field indicates the Number of Queues (NQ) to be created with this command. If CDW10.QID is not 0, the CDW10.QSIZE field indicates the Queue Size (QSIZE). For the Number of Queues (NQ) field indicates the number of Submission queues to be created with this command. If the value specified exceeds the Number of Queues supported by the controller 102, the controller 102 should return an error of invalid Number of Queues. This is a 0's based value. The Number of Queues can be retrieved using the "Get Features" command. The Create I/O Completion Queue will return a value, such as 3 h, in Command specific status, which indicates an Invalid Number of Queues, if the values specified in NQ exceeds Number of Queues supported by the controller. For the PRP1 field, if CDW10.QID is set to 0, then the PRP1 field specifies a 64-bit base memory address pointer of the array of Submission queue entries as defined below (but not limited to the table below).

TABLE 2

List of Submission Queue Entries

| | | | | Bit | | | |
|---|---|---|---|---|---|---|---|
| | 127:64 | 63:48 | 47:32 | 31:16 | 15:03 | 02:01 | 00 |
| Description | PRP Entry 1 (PRP1) | Queue Size (QSIZE) | Queue identifier (QID) | Completion Queue Identifier (CQID) | Reserved | Queue Priority (QPRIO) | Physically contiguous (PC) |
| | PRP Entry 1 (PRP1) | Queue Size (QSIZE) | Queue identifier (QID) | Completion Queue Identifier (CQID) | Reserved | Queue Priority (QPRIO) | Physically contiguous (PC) |
| | PRP Entry 1 (PRP1) | Queue Size (QSIZE) | Queue identifier (QID) | Completion Queue Identifier (CQID) | Reserved | Queue Priority (QPRIO) | Physically contiguous (PC) |
| | PRP Entry 1 (PRP1) | Queue Size (QSIZE) | Queue identifier (QID) | Completion Queue Identifier (CQID) | Reserved | Queue Priority (QPRIO) | Physically contiguous (PC) |
| | PRP Entry 1 (PRP1) | Queue Size (QSIZE) | Queue identifier (QID) | Completion Queue Identifier (CQID) | Reserved | Queue Priority (QPRIO) | Physically contiguous (PC) |
| | PRP Entry 1 (PRP1) | Queue Size (QSIZE) | Queue identifier (QID) | Completion Queue Identifier (CQID) | Reserved | Queue Priority (QPRIO) | Physically contiguous (PC) |

500b allows the communication unit 402 to receive the single command from the host.

At step 504b, the method 500b includes detecting a desired and/or triggering value (e.g., 0 h) is specified in the queue identifier. In at least one example embodiment, the method 500b allows the creation unit 404 to detect a desired and/or triggering value (e.g., 0 h) is specified in the queue identifier. For example, if the "CDW10.QID" field has a value specified as 0 h, then the controller 102 should interpret that this command is intended to create multiple I/O submission queues.

If it is determined at step 506B that the queue size specified in the single command is not within a desired value range, such as the I/O queue limit supported by the NVMe controller 102, then at step 510b, the method 500b includes sending the error message to the controller 102. In at least one example embodiment, the method 500b allows the communication unit 402 to send the error message to the NVMe controller 102. If it is determined at step 506B that the queue size specified in the single command is within a desired value range, such as the I/O queue limit supported by the NVMe controller 102, then at step 508b, the method 500b includes analyzing the queue size specified in the single command. In at least one example embodiment, the method 500b allows the creating unit 404 to analyze the At step 514b, the method 500b includes processing the queue identifier and the queue size. In at least one example embodiment, the method 500b allows the creating unit 404 to process the queue identifier and the queue size. At step 516B, the method 500b includes creating the submission queue in the host memory based on the queue size. In at least one example embodiment, the method 500b allows the creating unit 404 to create the submission queue in the host memory. At step 518b, the method 500b includes sending response to the host driver 104. In at least one example embodiment, the method 500b allows the communication unit 402 to send response to the host driver 104. The response corresponds to the creation of I/O submission queues in the host memory.

The various actions, acts, blocks, steps, and the like in the method 500b may be performed in the order presented, in a different order or simultaneously. Further, in some example embodiments, some actions, acts, blocks, steps, and the like may be omitted, added, modified, skipped, and the like without departing from the scope of the invention.

Figure 6A:
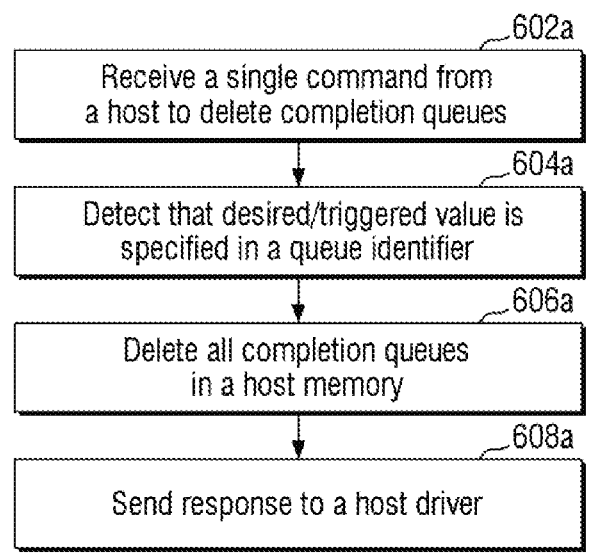
FIG. 6A is a flow diagram illustrating a method for deleting all I/O completion queues by a NVMe controller according to at least one example embodiment.

FIG. 6A is a flow diagram illustrating a method 600a for deleting all I/O completion queues by the NVMe controller 102, according to at least one example embodiment as disclosed herein. In at least one example embodiment, with a single "Delete I/O completion queue" command some or all of the I/O completion queues may be deleted.

At step 602*a*, the method 600*a* includes receiving a single command from the host. In at least one example embodiment, the method 600*a* allows the communication unit 402 to receive the single command from the host. At step 604*a*, the method 600*a* includes detecting a desired and/or triggering value (e.g., 0 h) is specified in the queue identifier. In at least one example embodiment, the method 600*a* allows the deletion unit 406 to detect that the desired and/or triggering value, such as 0 h, is specified in the queue identifier.

At step 606A, the method 600*a* includes deleting all completion queues in the host memory. In at least one example embodiment, the method 600*a* allows the deletion unit 406 to delete all completion queues in the host memory. For example, the CDW10.QID field indicates the identifier of the completion queues to be deleted. The desired and/or triggering value, such as 0 h, indicates that the controller 102 should delete all I/O completion queues. With the single "Delete I/O completion queue" command, all the I/O completion queues can be deleted.

At step 608*a*, the method 600*a* includes sending a response to the host driver 104. In at least one example embodiment, the method 600*a* allows the communication unit 402 to send the response to the host driver 104. The response corresponds to the deletion of all I/O completion queues in the host memory.

In at least one example embodiment, the system may also delete already created (e.g., pre-existing) I/O completion queues by using the single "Delete I/O Completion Queue" command.

The various actions, acts, blocks, steps, and the like in the method 600*a* may be performed in the order presented, in a different order or simultaneously. Further, in some example embodiments, some actions, acts, blocks, steps, and the like may be omitted, added, modified, skipped, and the like without departing from the scope of the invention.

FIG. 6B is a flow diagram illustrating a method 600*b* for deleting the I/O completion queues by the NVMe controller 102, according to at least one example embodiment as disclosed herein. At step 602*b*, the method 600*b* includes receiving the single command from the host. In at least one example embodiment, the method 600*b* allows the communication unit 402 to receive a single command from the host. At step 604*b*, the method 600*b* includes detecting a desired and/or triggering value (e.g., 0 h) is specified in the queue identifier. In at least one example embodiment, the method 600*b* allows deletion unit 406 to detect a desired and/or triggering value (e.g., 0 h) is specified in the queue identifier. At step 606B, the method 600*b* includes analyzing the queue size specified in the single command. In at least one example embodiment, the method 600*b* allows the deletion unit 406 to analyze the queue size specified in the single command.

At step 608*b*, the method 600*b* includes processing the queue identifier and the queue size. In at least one example embodiment, the method 600*b* allows the deletion unit 406 to process the queue identifier and the queue size. At step 610*b*, the method 600*b* includes deleting completion queues in the host memory. In at least one example embodiment, the method 600*b* allows the deletion unit 406 to delete the completion queues in the host memory. At step 612*b*, the method 600*b* includes sending the response to the host driver 104. In at least one example embodiment, the method 600*b* allows the communication unit 406 to send the response to the host driver 104. The response corresponds to the deletion of I/O completion queues in the host memory.

For example, with a single "Delete I/O Completion Queue" command, some or all of the completion queues may be deleted.

In at least one example embodiment, the system may also delete the already created I/O completion queues by using the single "Delete I/O Completion Queue" command.

The various actions, acts, blocks, steps, and the like in the method 600*b* may be performed in the order presented, in a different order or simultaneously. Further, in some example embodiments, some actions, acts, blocks, steps, and the like may be omitted, added, modified, skipped, and the like without departing from the scope of the invention.

Figure 6C:
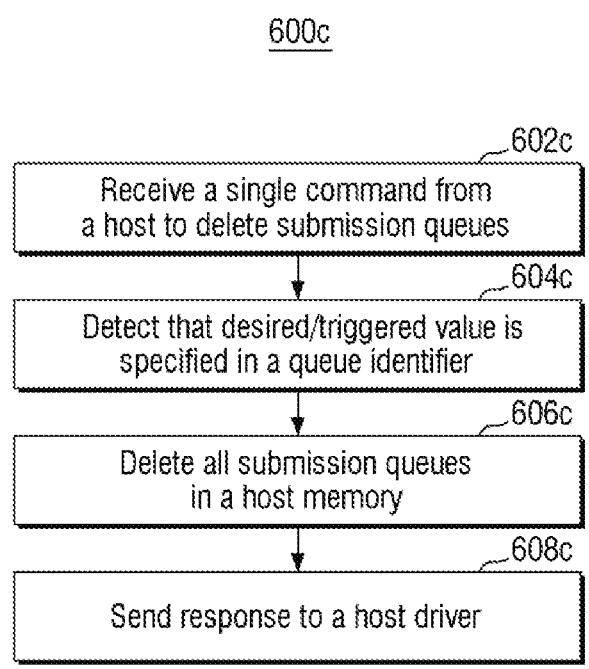
FIG. 6C is a flow diagram illustrating a method for deleting all I/O submission queues by a NVMe controller according to at least one example embodiment.

FIG. 6C is a flow diagram illustrating the method 600*c* for deleting some or all of the I/O submission queues by the NVMe controller 102, according to at least one example embodiment as disclosed herein. At step 602*c*, the method 600*c* includes receiving a single command from the host. In at least one example embodiment, the method 600*c* allows the communication unit 402 to receive the single command from the host. At step 604*c*, the method 600*c* includes detecting a desired and/or triggering value (e.g., 0 h) is specified in the queue identifier. In at least one example embodiment, the method 600*c* allows the deletion unit 406 to detect a desired and/or triggering value (e.g., 0 h) is specified in the queue identifier.

At step 606C, the method 600*c* includes deleting some or all of the submission queues in the host memory. In at least one example embodiment, the method 600*c* allows the deletion unit 406 to delete all submission queues in the host memory. For example, the CDW10.QID field indicates the identifiers of the submission queue to be deleted. The value of 0 h indicates that the controller 102 should delete all I/O submission queues. With the single "Delete I/O submission queue" command, all of the I/O submission queues can be deleted. At step 608*c*, the method 600*c* includes sending response to the host driver 104. In at least one example embodiment, the method 600*c* allows the communication unit 402 to send the response to the host driver 104. The response corresponds to the deletion of all I/O submission queues in the host memory.

In at least one example embodiment, the system may also delete the already created I/O submission queues by using the single "Delete I/O submission queues" command.

The various actions, acts, blocks, steps, and the like in the method 600*c* may be performed in the order presented, in a different order or simultaneously. Further, in some example embodiments, some actions, acts, blocks, steps, and the like may be omitted, added, modified, skipped, and the like without departing from the scope of the invention.

Figure 6D:
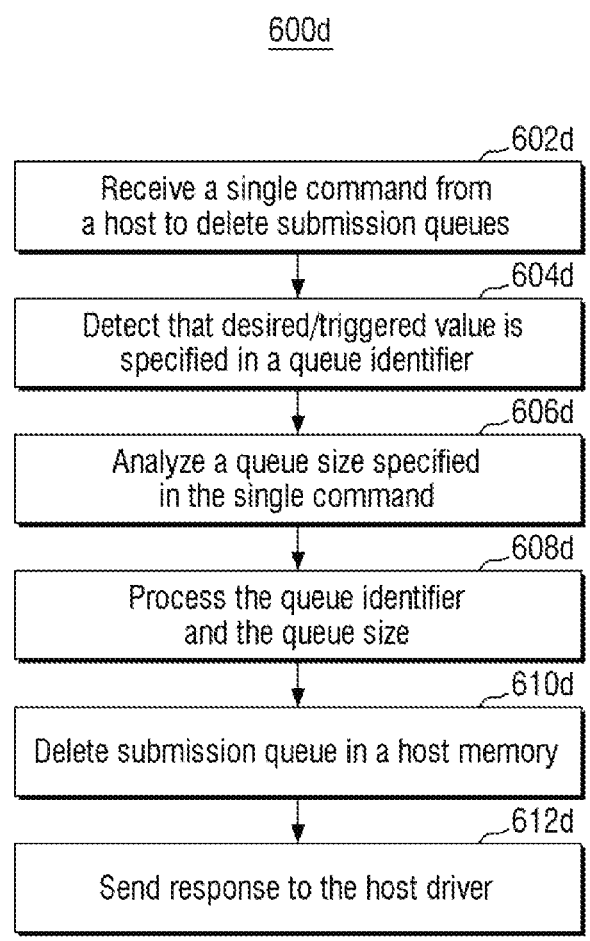
FIG. 6D is a flow diagram illustrating a method for deleting all I/O submission queues by an NVMe controller according to at least one example embodiment.

FIG. 6D is the flow diagram illustrating the method 600*d* for deleting the I/O submission queues by the NVMe controller 102, according to at least one example embodiment as disclosed herein. At step 602*d*, the method 600*d* includes receiving a single command from the host. In at least one example embodiment, the method 600*d* allows the communication unit 402 to receive the single command from the host. At step 604*d*, the method 600*d* includes detecting that a desired and/or triggering value, such as 0 h, is specified in the queue identifier. In at least one example embodiment, the method 600*d* allows the deletion unit 406 to detect that a desired and/or triggering value, such as 0 h, is specified in the queue identifier. At step 606D, the method 600*d* includes analyzing the queue size specified in the single command. In at least one example embodiment, the method 600*d* allows the deletion unit 406 to analyze the queue size specified in the single command. At step 608*d*, the method 600*d* includes processing the queue identifier and the queue size. In at least one example embodiment, the method 600*d* allows the deletion unit 406 to process the queue identifier and the queue size. At step 610*d*, the method 600*d* includes deleting submission queues in the host memory. In at least one example embodiment, the method 600*d* allows the deletion unit 406 to delete the submission queues in the host memory. At step 612*d*, the method 600*d* includes sending the response to the host driver 104. In at least one example embodiment, the method 600*d* allows the communication unit 406 to send the response to the host driver 104. The response corresponds to the deletion of I/O submission queues in the host memory.

For example, with a single "Delete I/O submission queue" command, some or all of the submission queues can be deleted. In at least one example embodiment, the system may also delete the already created I/O submission queues by using the single "Delete I/O submission queue" command.

The various actions, acts, blocks, steps, and the like in the method 600*d* may be performed in the order presented, in a different order or simultaneously. Further, in some example embodiments, some actions, acts, blocks, steps, and the like may be omitted, added, modified, skipped, and the like without departing from the scope of the invention.

The example embodiments disclosed herein can be implemented through at least one software program running on at least one hardware device and performing network management functions to control the elements. The elements shown in the FIGS. 1 to 4 include blocks which can be at least one of a hardware device, or a combination of a hardware device and a software module.

It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. A method of managing input/output (I/O) queues by a Non-Volatile Memory Express (NVMe) controller, the method comprising:
   receiving a single command from a host which indicates performance of at least one of creating multiple I/O queues and deleting multiple I/O queues;
   processing at least one of a queue identifier and a queue size included in the single command; and
   performing the at least one of creating the I/O queues and deleting the I/O queues, in a host memory based on results of the processing.

2. The method of claim 1, further comprising:
   sending a response to the host, the response corresponding to at least one of creation of the I/O queues and deletion of the I/O queues.

3. The method of claim 1, wherein the I/O queues are completion queues.

4. The method of claim 1, wherein the I/O queues are submission queues.

5. The method of claim 1, wherein when the results of the processing indicates that the creating the I/O queues is to be performed, the performing includes:
   detecting that a value of 0 h is specified in the queue identifier;
   analyzing the queue size specified in the single command;
   analyzing a Physical Region Page (PRP) value specified in the single command; and
   creating the I/O queues based on the queue size.

6. The method of claim 1, wherein when the results of the processing indicates that deleting the I/O queues is to be performed, the performing includes:
   detecting that a value of 0 h is specified in the queue identifier;
   analyzing the queue size specified in the single command; and
   deleting a number of the I/O queues based on the queue size.

7. The method of claim 1, wherein when results of the processing indicates that deleting the I/O queues is to be performed, the performing includes:
   detecting that a value of 0 h is specified in the queue identifier; and
   deleting the I/O queues present in the host memory.

8. The method of claim 5, wherein the analyzing the queue size specified in the single command comprises:
   determining whether the queue size specified in the single command is within an I/O queue limit supported by the NVMe controller; and
   transmitting an error message based on results of the determining.

9. A method for controlling a Non-Volatile Memory Express (NVMe) controller, the method comprising:
   receiving a NVMe command from a host related to a plurality of input/output (I/O) queues, the NVMe command including a queue identifier field;
   determining whether the queue identifier field has stored a desired value;
   deleting the plurality of I/O queues in a host memory based on results of the queue identifier; and
   transmitting a response to the host, the response including results of the deleting.

10. The method of claim 9, wherein the desired value is 0 h.

11. The method of claim 9, wherein the I/O queues are completion queues.

12. The method of claim 9, wherein the I/O queues are submission queues.

13. The method of claim 9, further comprising:
   analyzing a queue size field included in the NVMe command;
   determining whether an error occurred based on results of the analyzing; and
   transmitting an error messages as the response to the host.

* * * * *